United States Patent [19]

Moffett, Jr.

[11] 4,065,876
[45] Jan. 3, 1978

[54] PORTABLE GARDEN AND METHOD OF PRODUCING SAME

[76] Inventor: F. Wesley Moffett, Jr., 944 Allens Creek Road, Rochester, N.Y. 14618

[21] Appl. No.: 710,447

[22] Filed: Aug. 2, 1976

[51] Int. Cl.² .............................................. A01G 9/02
[52] U.S. Cl. ...................................................... 47/83
[58] Field of Search ................... 47/16, 39, 47, 66, 70, 47/82, 83, 84, 86, 1.1, 67, 68, 69, 72, 73, 85, 87

[56] References Cited

U.S. PATENT DOCUMENTS

| | | | |
|---|---|---|---|
| 922,888 | 5/1909 | Grunwaldt | 47/16 |
| 1,752,597 | 4/1930 | Jackson | 47/83 |
| 1,820,843 | 8/1931 | Spitz | 47/39 |
| 3,471,968 | 10/1969 | Letz | 47/47 |
| 3,613,309 | 10/1971 | Coburn | 47/79 |
| 3,703,050 | 11/1972 | Edwards | 47/39 X |

FOREIGN PATENT DOCUMENTS

2,253,451  7/1973  France ...................................... 47/83

*Primary Examiner*—Clifford D. Crowder
*Assistant Examiner*—James R. Feyrer
*Attorney, Agent, or Firm*—Cumpston & Shaw

[57] ABSTRACT

The garden comprises turkey fencing rolled into a cylindrical cage, placed upright on a corrugated surface, and lined with a vaporproof paper sleeve. The sleeve is filled with moist soil in which a perforated soaker is embedded and connected by a tube to the exterior of the liner. In a second form, a rigid support is enclosed in a large plastic bag containing soil. The support has a large circular base covered by the soil and a reduced-diameter mast extending upwardly through the center of the soil and out of the top of the bag. A soaker of the type noted above is buried in the soil, and the upper end of the bag is tied closed around the outside of the mast. The base of each support has an axial bore into which the upper end of the mast of another support can be inserted to stack this form of garden one upon the other. In use, small holes are cut in the liner or bag, and seeds or plants are planted in the exposed soil so that their sprouts can grow out of the holes.

12 Claims, 6 Drawing Figures

PORTABLE GARDEN AND METHOD OF PRODUCING SAME

BACKGROUND OF THE INVENTION

This invention relates to gardening, and more particularly to small, self-contained gardens and a method of producing them. Even more particularly, this invention relates to small, portable gardens produced in modular form so that they can be arranged in any desired manner in or out of doors, and in the case of at least one embodiment, can be stacked vertically one upon the other, if desired.

The shortage of food which is prevalent in so many of the so-called underdeveloped nations of the world has occurred in most cases because of a lack of sufficient fresh water and/or tillable soil. Even in those nations where there are no apparent food shortages, a great percentage of the people, such as the apartment dwellers in cities, and the like, have no access to tillable soil, and consequently, apart from maintaining a few small house plants, are precluded from having their own gardens.

Still another problem encountered by growers of the type that employ synthetic fertilizers is the fact that natural rainfall tends very often to wash away much of the fertilizer before it has been absorbed into the plants, thus in many cases polluting the lakes and streams, causing therein the undesirable growth of algae, weeds, and the like.

SUMMARY OF THE INVENTION

It is an object of this invention, therefore, to provide an improved method of forming relatively small, individual, portable gardens, which contain the soil necessary for growth, and which are readily adaptable for use in both urban and suburban areas, and either indoors or outdoors.

A further object of this invention is to provide an improved, portable garden of the variety which contains its own soil and is readily movable regardless of the stage of growth of its plants.

Still another object of this invention is to provide improved, modular-type gardening devices which are readily portable, and which are designed to be stacked one upon the other, as desired, thereby to make more efficient use of growing space.

It is an object also of this invention to provide a novel core which is particularly suited for use in producing portable gardens of the type described.

Other objects of the invention will be apparent hereinafter from the specification and from the recital of the appended claims, particularly when read in conjunction with the accompanying drawings.

DESCRIPTION OF THE PREFERRED EMBODIMENTS

Figure 1:
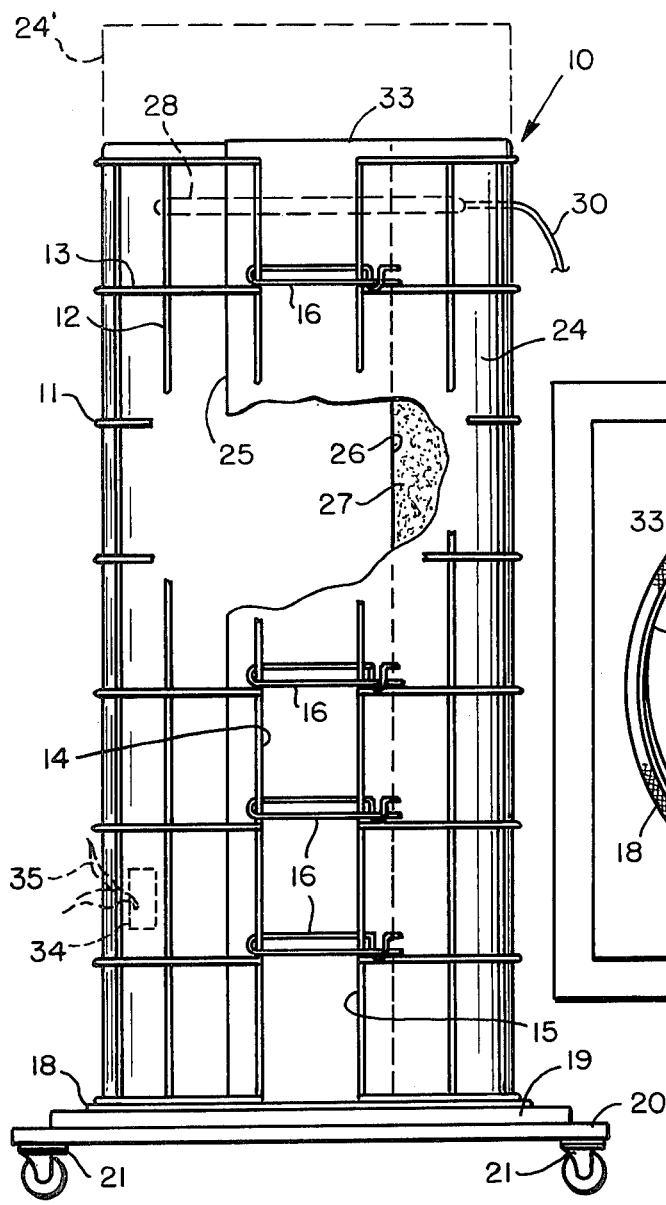
FIG. 1 is an elevational view of a self-contained gardening device made according to one embodiment of this invention, portions of the device being broken away for purposes of illustration.
Figure 2:
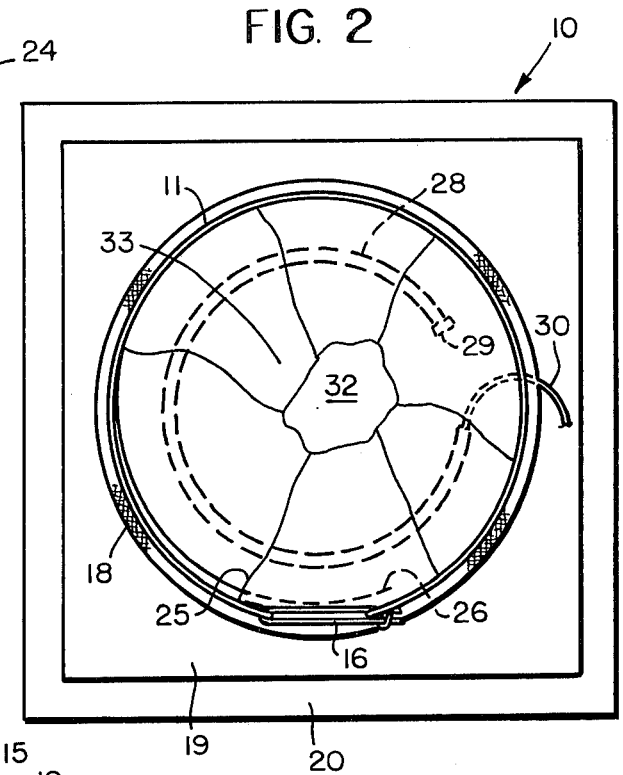
FIG. 2 is a plan view of the device shown in FIG. 1.
Figure 1A:
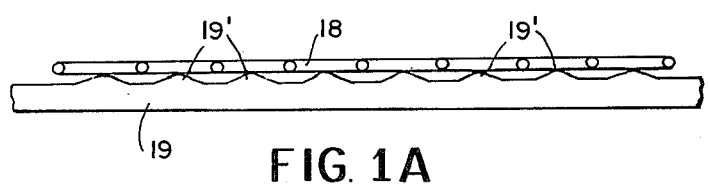
FIG. 1A is an enlarged segmental view of a portion of the base member of FIG. 1.
Figure 4:
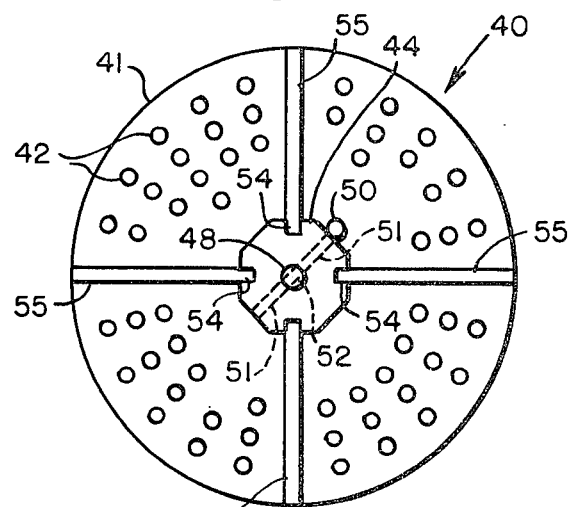
FIG. 4 is a plan view of this core member.
Figure 3:
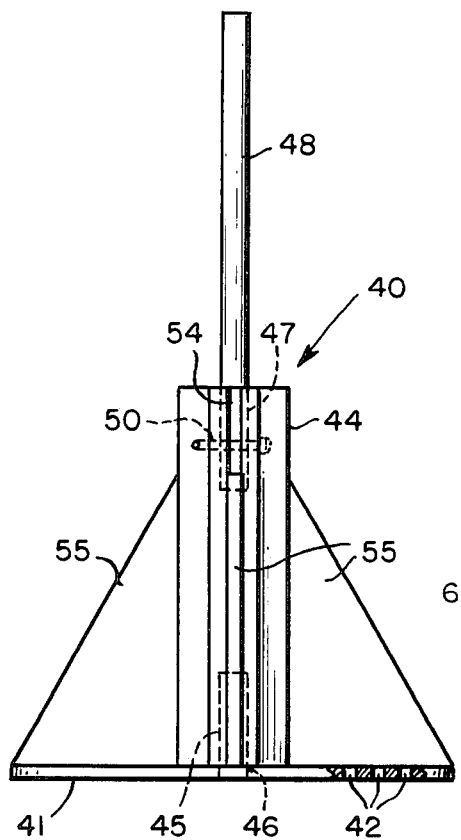
FIG. 3 is an elevational view of a novel core member which is particularly suited for use in producing a gardening device made according to a second embodiment of this invention.

Referring now to the drawings and to the embodiment illustrated in FIGS. 1, 1A and 2, 10 denotes generally a self-contained gardening device preferably comprising a cylindrical cage 11 made by rolling a rectangular section of conventional fencing material into the configuration of a sleeve or cylinder. The fencing material, which consists of intersecting strands 12 and 13 of turkey wire or the like, has opposite ends 14 and 15 thereof releasably connected together by a plurality of clamps such as conventional safety pin closers 16. The cage is placed upright on a horizontal support, which in the illustrated embodiment comprises a base member 19 having a corrugated or bumpy upper surface 19' covered by a layer 18 of screening. Member 19 is carried by a plate 20, which is supported adjacent its corners on conventional casters 21.

Mounted within the cage 11 coaxially thereof is a vaporproof or waterproof liner 24, which is generally cylindrical in configuration. Liner 24 is formed by rolling a rectangular section of vaporproof paper into the shape of a tube, and placing the liner in the cage 11 so that one vertically disposed edge 25 of the liner overlaps its other vertical edge 26. Moreover, the height of the tubular liner 24 is slightly greater than that of the cage 11 so that, when initially placed in the cage, the liner projects slightly above the upper end of cage 11 as denoted by broken lines 24' in FIG. 1. After the liner has been placed in cage 11, it is filled with moist soil 27, which forms within the liner a cylindrical core that forces the liner outwardly against the cage 11, the liner itself, however, preventing any of the soil from passing through the interstices in cage 11.

Before completely filling the liner 24 with the soil 27, a perforated soaker or irrigation hose 28 is preferably embedded in the soil adjacent the upper end of the cage. This hose is arranged in the form of a loop generally coaxially of the cage 11, and is closed at one end by a cap or plug 29, and is connected at its opposite end to a length 30 of flexible tubing, which extends through an opening in the liner 24 externally of cage 11 for connection, when desired, to a supply of water.

After the soaker 28 has been embedded in the soil, a generally disc-shaped paper cover 32 may be inserted on top of the soil in the upper end of the liner 24, after which the projecting portion 24' of the liner is folded inwardly as at 33 over the cover 32. If desired, a plurality of pins (not shown) can then be inserted through the folded liner section 33 and the cover 32, and into the soil 27 to hold the top of the liner closed.

In use, a knife or other sharp instrument can be inserted through an interstice in cage 11 to cut an opening in the liner 24, as shown for example by broken lines at 34 in FIG. 1, to expose the soil 27 in which one or more seeds or plants can then be planted. With proper watering of the soil 27 by the soaker 28, the seeds will in time germinate and produce a plant which is free to grow exteriorly of the cage 11, as noted, for example, by broken lines at 35 in FIG. 1. Obviously, numerous openings can be placed in the liner 24 to enable numerous seeds or plants to be planted around the outside of the soil core, whereby plants can be cultivated one above the other in the garden 10, and at angularly spaced points about the axis thereof. Seeds or plants may be planted on the folded-over top of the core if desired.

Referring now to FIGS. 3–5, 40 denotes generally a support or core member, which is adapted to be employed in producing a portable garden made according to another embodiment of this invention. Member 40 comprises a circular, generally disc-shaped base 41 having a plurality of spaced openings 42 extending therethrough. Secured to and projecting above the upper surface of base 41 centrally thereof is a mast section comprising an octagonally-shaped hub 44, which has in its lower end an axially extending blind bore 45 that registers with a similar opening 46 formed in the center of the base 41.

In its upper end the hub 44 has a further, axially extending blind bore 47 in which is seated the lower end of a cylindrical, vertically disposed post or mast 48, which projects above the upper end of hub 44. The lower end of post 48 is releasably secured in the bore 47 by a pin 50, which extends through registering openings 51 and 52 formed in the hub 44 and the lower end of the post 48, respectively, and between a pair of the opposed, plane surfaces formed on the outside of the hub 44.

Each of the four plane surfaces, which are formed on hub 44 at opposite sides of the surfaces intersected by the pin openings 51, has therein a vertically extending groove 54. The grooves 54 face outwardly of the hub 44 at 90° intervals about its axis, and have secured therein the vertically disposed edges of four triangularly-shaped rib plates or gussets 55, the lower edges of which are fastened to the upper surface of the base 41 at 90° intervals about its axis. These four plates 55 rigidly support the hub member 44 and the attached post 48 in vertical positions on the base 41.

In use, the core 40 is placed in a large, plastic bag 60 of heavy polyethylene material, or the like, so that the base 41 of the core rests on the bottom of the bag, and so that the post 48 extends vertically upwardly through the center of the bag. In the embodiment shown in FIG. 5, the bag 60 containing the core 40 is supported on a movable platform 20 of the type described in connection with the first embodiment; but it will be understood that, if desired, the bag containing the core 40 can be placed or rested on any flat surface. After the core 40 has been placed in the bag 60, the bag is filled with a quantity of soil 61, which causes the filled bag to extend vertically around the outside of the post or mast 48 of the core member. The bag 60, of course, is designed to have a diameter aproximately equal to that of the outside diameter of the base 41, so that substantially all of soil 61 in the bag will be positioned above and in registry with the rigid base 41. When the bag 60 is nearly filled, a soaker 28, which may be of the type employed in the first embodiment, is embedded in the soil adjacent the upper end of the bag and coaxially about the post 48. Also, as in the first embodiment, the supply tube 30 for the soaker is lead through an opening in the bag 60 to the exterior thereof for connection to a water supply, when desired.

After the soaker 28 has been embedded slightly beneath the upper end of the soil in the bag, the bag 60 is folded inwardly at its upper end as at 62 and is tied by a length of rope or wire 63 firmly around the post 48 and slightly beneath the upper end thereof. This effectively closes the upper end of the bag or garden, and completes the assembly of the modified embodiment of this invention.

Figure 5:
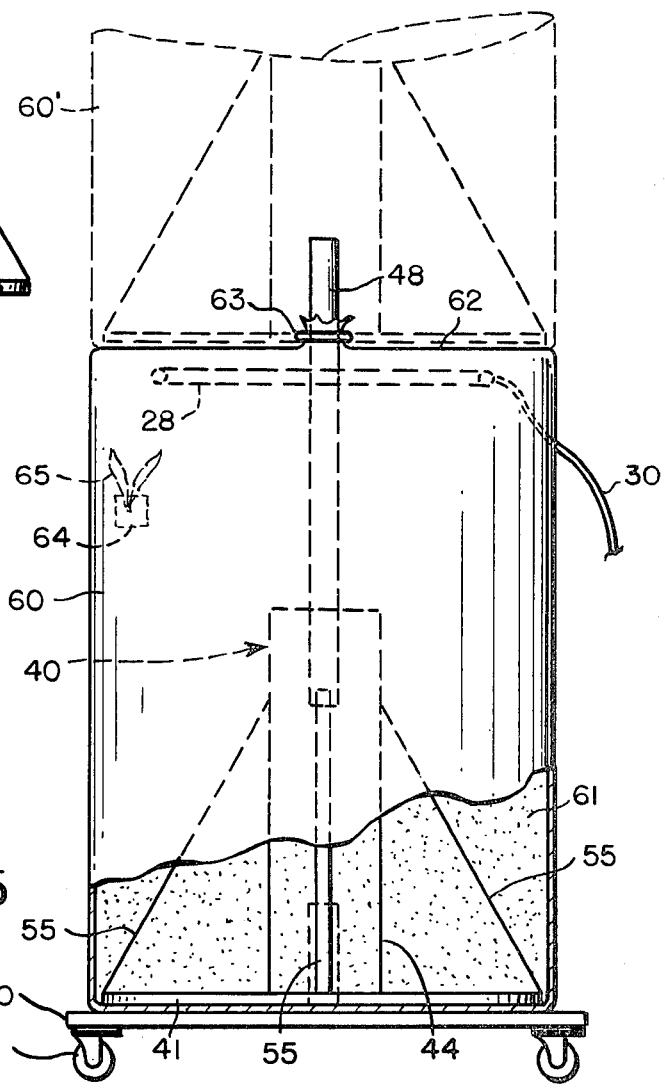
FIG. 5 is an elevational view of a self-contained gardening device made according to a second embodiment of this invention, a portion of the bag, which forms part of this device, being broken away for purposes of illustration.

In use, the filled bag 60 can be planted in a manner similar to that of the first embodiment, merely by cutting openings in the bag, such as shown for example by broken lines at 64, after which seeds or plants can be inserted in the exposed soil to produce, after germination, a plant the leaves of which can grow externally of the bag, as shown for example by broken lines at 65 in FIG. 5. However, since there is no exterior framework in this embodiment, the openings for the seeds can be placed substantially at will around the periphery of bag 60. In addition, if desired, seeds or plants may be planted in suitable openings cut in the top of the bag.

If desired, two or more of the gardens illustrated in FIG. 5 can be stacked vertically one upon the other by cutting through the bottom of a bag 60' (FIG. 5) around the opening 46 in the associated base member 41, so that the registering openings 45 and 46 in the bottom of the core in bag 60' can be inserted over the upper end of a post 48, for example that post which is shown in solid lines in FIG. 5. Thus, the bag 60' will be supported by its core member 40 coaxially on the upper end of the post 48 in bag 60. Obviously, any number of the bags 60 can be placed one upon the other in this manner to provide a plurality of individual, stacked garden units, each of which will have its own soaker 28 for irrigational purposes.

From the foregoing, it will be apparent the instant invention provides relatively simple and inexpensive means for producing portable gardens which can be readily assembled and easily shipped or transported to any desired site. Portable gardens of the type disclosed herein, of course, can be made in almost any size, so that they will be small enough, if desired, to enable the average housewife to manipulate the garden, and in the case of the second embodiment, to stack individual gardens in modular form one upon the other to make more effective use of all available space, either indoors or outdoors. Since the gardens are easily movable, it is possible to readily rearrange the individual gardens depending upon the circumstances. In the case of the bags 60 illustrated in the second embodiment, it is possible to print the bags with a checkerboard design to facilitate the placement and desired spacing of seeds or plants. An additional advantage of the garden illustrated in the second embodiment is that the core member or backbone, which may be made of wood, plastic, or the like, can be used over and over again in the event that it is necessary to replace the bag 60 associated therewith.

While this invention has been described in detail in connection with only certain embodiments thereof, it will be apparent that it is capable of further modification, and that this application is intended to cover any such modifications that may fall within the scope of one skilled in the art of the appended claims.

Having thus described my invention, what I claim is:
1. A garden device for producing a vertical garden, comprising:
    a flexible plastic bag,
    a rigid core member mounted in said bag to form a rigid support for said bag, and having a plane, base section seated snugly in the bottom of said bag, an upright mast section having a reduced diameter relative to said base section, said mast section extending upwardly through the center of said bag, a supply of soil in said bag above said base section and surrounding said mast section, and substantially filling said bag, and means for securing the upper end of said bag closed over said soil.

2. A garden device as defined in claim 1, including a perforated tubular member embedded in said soil adjacent the upper end of said bag and extending at one end through a hole in said bag to the exterior thereof for connection to a supply of water.

3. A garden device as defined in claim 1, wherein said base section of said core member is circular and has an outer diameter approximately equal to the diameter of said bag, said mast section has a diameter substantially less than the diameter of said base section, and said base section has therethrough an axial bore registering with a blind bore in the bottom of said mast section, each of said registering bores having a diameter slightly larger than the diameter of the upper end of said mast section, whereby at least two garden devices may be stacked one on top of the other by inserting the upper end of the mast section of one garden device into the registering bores in the lower end of the core member of another garden device.

4. A garden device as defined in claim 3, wherein said mast section comprises:

a first post secured at its lower end to the upper surface of said base section centrally thereof, a second post having a diameter substantially smaller than that of said first post, and releasably secured at its lower end in an axial blind bore formed in the upper end of said first post, said second post projecting at its upper end out of the closed, upper end of said bag, and a plurality of reinforcing ribs secured between said first post and said base section at equiangularly spaced points about the axis of said base section.

5. The garden device of claim 4 wherein said first post has a plurality of vertically extending plane surfaces, an axially extending groove in each of said plane surfaces, and each of said ribs are right-triangularly shaped and have one side nesting in a corresponding one of said grooves and an adjacent side secured to said base section, and said base section has a plurality of spaced apart openings extending therethrough.

6. A garden device for producing a vertical garden comprising:

a flat base member having laterally spaced apart projections vertically extending from its upper surface;

a flat screen mountable on said projections in parallel relation to said base member;

a meshed material adapted to be rolled into a tubular cage having upper and lower open ends, said cage being mounted on said base member and screen with said lower cage end resting on said screen; and a flexible vapor proof material rolled into the form of a sleeve having upper and lower open ends and inserted into said cage with said lower sleeve end supported by said screen and said upper sleeve end in position for receiving a quantity of soil forcing said sleeve into engagement with said cage whereby openings may be made in said sleeve through said cage for exposing the soil into which plant seeds or plants may be embedded for growth through said cage.

7. The garden device of claim 6 and further comprising a perforated tubular member embedded within the soil adjacent the upper open end of said sleeve, and having an open end of said tubular member extending through said upper end of said sleeve for connection to a water supply for watering the soil.

8. The garden device of claim 7 wherein said tubular member is ring shaped and has its other end closed.

9. The garden device of claim 8 and further comprising means for closing said upper open end of said sleeve.

10. A method of producing a vertical garden device comprising:

providing a flat support member having laterally extending projections on its upper surface;

placing a flat screen on said projections in parallel relation to said support member;

rolling a rectangular section of meshed material into a tubular shape and securing the ends thereof to form a tubular cage having upper and lower open ends;

vertically mounting said cage on said support with said lower cage end resting on said screen;

rolling a sheet of vapor-proof material into a sleeve having upper and lower open ends and a diameter slightly less than the diameter of said cage;

inserting said sleeve into said cage with its lower end resting on said screen;

filling said sleeve with soil through its upper open end;

cutting openings in said sleeve through said cage to expose the soil; and embedding plant seeds or plants in the exposed soil for growth through said cage.

11. The method of claim 10 comprising the further step of embedding within the soil a perforated tubular member having an open end connected to a water supply for watering the soil.

12. The method of claim 11 comprising the further step of closing said upper open end of said sleeve.

* * * * *